United States Patent
Zhong

(10) Patent No.: US 10,108,048 B2
(45) Date of Patent: Oct. 23, 2018

(54) HIGH TRANSMITTANCE PSVA LIQUID CRYSTAL DISPLAY PANEL AND MANUFACTURING METHOD THEREOF

(71) Applicant: Shenzhen China Star Optoelectronics Technology Co., Ltd., Shenzhen (CN)

(72) Inventor: Xinhui Zhong, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/694,862

(22) Filed: Sep. 4, 2017

(65) Prior Publication Data

US 2017/0363912 A1 Dec. 21, 2017

Related U.S. Application Data

(63) Continuation of application No. 14/764,168, filed on Jul. 28, 2015, now Pat. No. 9,785,012.

(30) Foreign Application Priority Data

Apr. 28, 2015 (CN) .......................... 2015 1 0208473

(51) Int. Cl.
- *G02F 1/1337* (2006.01)
- *G02F 1/1333* (2006.01)
- *G02F 1/1343* (2006.01)

(52) U.S. Cl.
CPC .... *G02F 1/133707* (2013.01); *G02F 1/13439* (2013.01); *G02F 1/133345* (2013.01); *G02F 1/133753* (2013.01); *G02F 1/134309* (2013.01); *G02F 2001/133757* (2013.01); *G02F 2001/133761* (2013.01); *G02F 2001/134318* (2013.01); *G02F 2001/134345* (2013.01); *G02F 2201/121* (2013.01); *G02F 2201/122* (2013.01);

(Continued)

(58) Field of Classification Search
CPC .................................................. G02F 1/133707
See application file for complete search history.

(56) References Cited

U.S. PATENT DOCUMENTS

2007/0070266 A1* 3/2007 Ochiai .............. G02F 1/133345
349/106
2011/0261295 A1* 10/2011 Kim .................. G02F 1/133707
349/96

(Continued)

*Primary Examiner* — Sang V Nguyen
(74) *Attorney, Agent, or Firm* — Leong C. Lei

(57) ABSTRACT

A liquid crystal display panel includes an upper substrate on which a first common electrode, an insulation layer, and a second common electrode are formed, a lower substrate on which a pixel electrode is formed, and a plurality of polymer projections formed on surfaces of the second common electrode and the pixel electrode to align liquid crystal molecules. One of the first and second common electrodes is a patternized common electrode and the other is a planar common electrode. The pixel electrode is a planar electrode. In a manufacturing process, a voltage is applied to the pixel electrode and the patternized common electrode to cause the liquid crystal molecules to tilt so as to form multiple domains in each of sub-pixels. In a regular operation, a voltage is applied to the pixel electrode and the planar common electrode to make the entire pixel area to simultaneously achieve the maximum transmittance.

10 Claims, 11 Drawing Sheets

(52) U.S. Cl.
 CPC .. *G02F 2201/123* (2013.01); *G02F 2202/023* (2013.01)

(56) References Cited

U.S. PATENT DOCUMENTS

| | | | |
|---|---|---|---|
| 2012/0206436 A1* | 8/2012 | Nakata | G02F 1/134309 345/212 |
| 2012/0326950 A1* | 12/2012 | Park | G09G 3/3607 345/55 |
| 2013/0057815 A1* | 3/2013 | Takano | G02F 1/134309 349/123 |
| 2014/0098314 A1* | 4/2014 | Zhong | C09K 19/40 349/42 |
| 2014/0139794 A1* | 5/2014 | Ohnishi | G02F 1/133788 349/123 |
| 2015/0022750 A1* | 1/2015 | Ogawa | G02F 1/13 349/43 |
| 2015/0042922 A1* | 2/2015 | Kawahira | G02F 1/133555 349/61 |
| 2016/0252735 A1* | 9/2016 | Zhang | G02F 1/1343 349/15 |
| 2017/0153518 A1* | 6/2017 | Tang | G02F 1/13439 |

\* cited by examiner

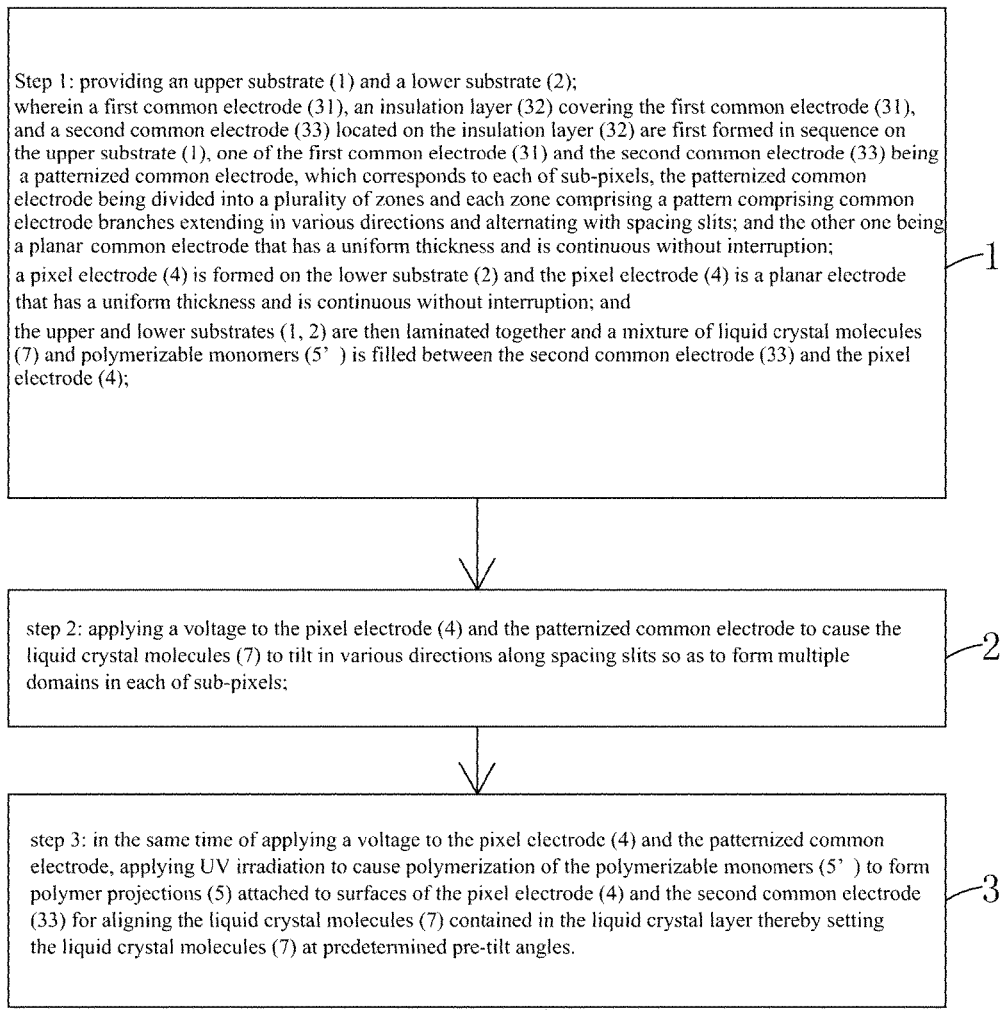

Step 1: providing an upper substrate (1) and a lower substrate (2);
wherein a first common electrode (31), an insulation layer (32) covering the first common electrode (31), and a second common electrode (33) located on the insulation layer (32) are first formed in sequence on the upper substrate (1), one of the first common electrode (31) and the second common electrode (33) being a patternized common electrode, which corresponds to each of sub-pixels, the patternized common electrode being divided into a plurality of zones and each zone comprising a pattern comprising common electrode branches extending in various directions and alternating with spacing slits; and the other one being a planar common electrode that has a uniform thickness and is continuous without interruption;
a pixel electrode (4) is formed on the lower substrate (2) and the pixel electrode (4) is a planar electrode that has a uniform thickness and is continuous without interruption; and
the upper and lower substrates (1, 2) are then laminated together and a mixture of liquid crystal molecules (7) and polymerizable monomers (5') is filled between the second common electrode (33) and the pixel electrode (4);

step 2: applying a voltage to the pixel electrode (4) and the patternized common electrode to cause the liquid crystal molecules (7) to tilt in various directions along spacing slits so as to form multiple domains in each of sub-pixels;

step 3: in the same time of applying a voltage to the pixel electrode (4) and the patternized common electrode, applying UV irradiation to cause polymerization of the polymerizable monomers (5') to form polymer projections (5) attached to surfaces of the pixel electrode (4) and the second common electrode (33) for aligning the liquid crystal molecules (7) contained in the liquid crystal layer thereby setting the liquid crystal molecules (7) at predetermined pre-tilt angles.

Fig. 14

HIGH TRANSMITTANCE PSVA LIQUID CRYSTAL DISPLAY PANEL AND MANUFACTURING METHOD THEREOF

CROSS REFERENCE TO RELATED APPLICATIONS

This is a continuation application of co-pending patent application Ser. No. 14/764,168, filed on Jul. 28, 2015, which is a national stage of PCT Application Number PCT/CN2015/082164, filed on Jun. 24, 2015, claiming foreign priority of Chinese Patent Application Number 201510208473.5, filed on Apr. 28, 2015.

BACKGROUND OF THE INVENTION

1. Field of the Invention

The present invention relates to the field of displaying technology, and in particular to a high transmittance PSVA (Polymer Stabilized Vertical Alignment) liquid crystal display panel and a manufacturing method thereof.

2. The Related Arts

Active thin-film transistor liquid crystal displays (TFT-LCDs) have been recently developed swiftly and have had wide applications recently. Mainstream TFT-LCDs currently available in the market belong to three categories, which are respectively twisted nematic (TN) or super twisted nematic (STN) type, in-plane switching (IPS) type, and vertical alignment (VA) type. Among them, VA type liquid crystal displays have extremely high contrast as compared to other types and may generally reach 4000-8000. This provides extremely wide applications in large-sized displays, such as televisions.

The reason that the VA type liquid crystal displays have the extremely high contrast is because liquid crystal molecules are arranged perpendicular to a surface of a substrate and have no phase difference in a dark state where no electricity is applied so as to have extremely low leakage of light and very low dark state brightness. According to contrast calculation equation, the lower the dark state brightness is, the higher the contrast will be. To allow the liquid crystal molecules in a VA type liquid crystal display panel to be arranged perpendicular to the surface of the substrate, the liquid crystal molecules must be subjected to alignment, of which the most common way is to coat a vertical alignment agent (which is a polymer material of polyimide (PI), a PI solution) on specific areas of upper and lower substrates and then the substrates are baked for a long time in a predetermined temperature to dry a solvent of the alignment agent thereby forming a PI alignment layer on the surfaces of the substrates. As shown in FIG. 1, a conventional VA type liquid crystal display panel comprises: an upper substrate 10, a lower substrate 20 opposite to the upper substrate 10, a liquid crystal layer 40 interposed between the lower substrate 10 and the upper substrate 20, and a PI alignment layer 30 formed on a surface of the upper substrate 10 that faces the lower substrate 20 and a surface of the lower substrate 20 that faces the upper substrate 10. Since the VA type liquid crystal display panel involves liquid crystal that are vertically rotating, birefringence of the liquid crystal molecules is relatively large, leading to a severer issue of color shift in a large view angle.

To provide a VA type liquid crystal display panel with bettered characteristics in wide view angles and to improve the issue of color shift, multi-domain VA (MVA) technology is often adopted, in which a sub-pixel is divided into multiple zones and the liquid crystal of each zone is caused to tilt in different direction when a voltage is applied so that the result of viewing from different angles would approach homogeneity and consistency. Various ways may be used to provide the MVA technology. As shown in FIGS. 2 and 3, one of such ways is to make an ITO pixel electrode 70 at one side in the form of a star-shaped pattern, while a common electrode 80 is made a planar electrode that has a uniform thickness and is continuous without interruption. Due to the unique ITO pixel electrode pattern, an inclined electrical field may be generated to induce the liquid crystal molecules 40 in different zones to tilt in different directions.

FIG. 2 is a top plan view of one side of a lower substrate 20 of a MVA type liquid crystal display panel, in which reference numerals 210 and 220 are respectively a scan line and a data line. A sub-pixel is divided into four zones. In each zone, the ITO pixel electrode 70 is formed of a pattern comprising pixel electrode branches extending in a different direction and alternating spacing slits. FIG. 3 is a cross-sectional view of the MVA type liquid crystal display panel taken along line A-A of FIG. 2, wherein the pixel electrode 70 that comprises the slits is formed on a planar lower passivation layer 60 and the PI alignment layer 30 that covers the pixel electrode 70 has an irregular surface, while a common electrical 80 that is in a planar form is provided on a planar upper passivation layer 90 and the PI alignment layer 30 that covers the common electrode 80 has a surface that shows a straight planar surface.

With the progress of technology, a kind of MVA type liquid crystal display panel that requires no PI alignment layer is available and is referred to as a polymer stabilized vertical alignment (PSVA) liquid crystal display panel. As shown in FIGS. 4-6, a pixel electrode 400 that is processed to form a star-shaped pattern is arranged on a lower substrate 200, while a planar common electrode 300 is arranged on an upper substrate 100. Polymer projections 500 attached to surfaces of the pixel electrode 400 and the common electrode 300 provide liquid crystal molecules 700 contained in a liquid crystal layer with pre-tilt angles in given directions. FIGS. 7-9 are schematic views illustrating key manufacturing processes of the conventional PSVA liquid crystal display panel. Firstly, a planar common electrode 300 is formed on an upper substrate 100 and a pixel electrode 400 that is processed to form a star-shaped pattern is manufactured on a lower substrate 200. The upper and lower substrates are laminated together and a mixture of liquid crystal molecules 700 and polymerizable monomers 500' is filled therein. A voltage is then applied to the common electrode 300 and the pixel electrode 400 to cause the liquid crystal molecules 700 to tilt in given directions, namely tilting in the directions of the slits of the pixel electrode 400 that is processed to form a star-shaped pattern. Then, ultraviolet (UV) ray is irradiated to cause reaction of the polymerizable monomers 500' to form polymer projections 500 attached to surfaces of the pixel electrode 400 and the common electrode 300 thereby providing the liquid crystal molecules 700 with pre-tilt angles in given directions. In the above manufacturing process, the pixel electrode 400 that is processed to form a star-shaped pattern has an important effect. If the pixel electrode does not comprise the star-shaped pattern, then upon the application of voltage, the tilting directions of the liquid crystal molecules would be random and uncontrollable.

Since the pixel electrode 400 that is processed to form a star-shaped pattern comprise a pattern that comprises pixel electrode branches that extend in various directions and alternate with the slits, the electric field formed thereby with respect to the opposite common electrode 300 is not uniform, the electric field corresponding to an area of the pixel electrode branch is apparently stronger than the electric field corresponding to an area of the slit thereby leading to a phenomenon of non-uniform brightness occurring in the pixel.

Further, according to the transmittance equation of the VA type liquid crystal display panel:

$$T=(\tfrac{1}{2})\sin^2 2\Delta\Phi \sin^2(\Gamma/2) \qquad (1)$$

where T is transmittance; $\Delta\Phi$ is an included angle between a long axis of liquid crystal and a polarizer, which provides the maximum efficiency at 45°; $\Gamma$ is phase difference, which is the effect of modulation of the rotation of liquid crystal molecules with respect to polarization light under an electric field.

The formula for $\Gamma$ is as follows:

$$\Gamma=\cos(a)*2\pi 8\Delta n*d/\lambda \qquad (2)$$

where a is an included angle between the long axis of liquid crystal molecule and a normal of a substrate, which is determined by the electric field applied to the liquid crystal molecules; d is thickness of a liquid crystal cell; and $\Delta n$ is refractive index difference between long and short axes of the liquid crystal.

It can be known from equation (1) that when $\Gamma$ is $\lambda$, the transmittance is maximum. Combining equation (1) with equation (2) provides that with the liquid crystal cell thickness d being fixed, the transmittance is determined by the electric field applied to the liquid crystal. When $\Gamma$ is smaller than $\pi$, the greater the electric field is, the greater the transmittance would be; and when $\Gamma$ is greater than $\pi$, the greater the electric field is, the smaller the transmittance would be.

Since the electric fields associated with the areas corresponding to the pixel electrode branches and the slits are not consistent, it is generally not possible to make the transmittance of these two areas simultaneously reach the maximum value. In other words, when $\Gamma$ of the pixel electrode branch is $\pi$, the value of $\Gamma$ of the area corresponding to the slit is smaller than $\pi$; and when the value of $\Gamma$ of the area corresponding to the slit reaches $\pi$, the value of $\Gamma$ of the area associated with the pixel electrode branch has already exceeded $\pi$. Thus, the entire pixel area cannot simultaneously reach the maximum transmittance and thus, it is not possible to achieve the maximum transmittance of a liquid crystal display panel and the brightness of the liquid crystal display panel is non-uniform.

SUMMARY OF THE INVENTION

An object of the present invention is to provide a high transmittance polymer stabilized vertical alignment (PSVA) liquid crystal display panel, which allows the entire pixel area to simultaneously achieve the maximum transmittance so as to overcome the issue of transmittance reduction of the prior art due to patternization of the pixel electrode and helping improve homogeneity of transmittance and brightness of the PSVA liquid crystal display panel, reducing the requirement of backlighting brightness by the PSVA liquid crystal display panel, and lowering down cost and power consumption of use An object of the present invention is also to provide a manufacturing method of a high transmittance PSVA liquid crystal display panel, wherein a PSVA liquid crystal display panel manufactured with the method has high transmittance and uniform brightness, reduces the requirement of backlighting brightness by the PSVA liquid crystal display panel, and lowers down cost and power consumption of use.

To achieve the above objects, the present invention provides a high transmittance PSVA liquid crystal display panel, which comprises an upper substrate and a lower substrate that is opposite to the upper substrate, a first common electrode, an insulation layer, and a second common electrode that are arranged to stack, in sequence from top to bottom, on a surface of the upper substrate that faces the lower substrate, a pixel electrode that is arranged on a surface of the lower substrate that faces the upper substrate, a liquid crystal layer interposed between the second common electrode and the pixel electrode, and a plurality of polymer projections formed on surfaces of the second common electrode and the pixel electrode;

one of the first common electrode and the second common electrode being a patternized common electrode, which corresponds to each of sub-pixels, the patternized common electrode being divided into a plurality of zones and each zone comprising a pattern comprising common electrode branches extending in various directions and alternating with spacing slits; and the other one being a planar common electrode that has a uniform thickness and is continuous without interruption;

the pixel electrode being a planar electrode that has a uniform thickness and is continuous without interruption;

the polymer projections align liquid crystal molecules contained in the liquid crystal layer so as to set the liquid crystal molecules at predetermined pre-tilt angles;

wherein in a manufacturing process of the high transmittance PSVA liquid crystal display panel, a voltage is applied to the pixel electrode and the patternized common electrode; and in a use of the high transmittance PSVA liquid crystal display panel, a voltage is applied to the pixel electrode and the planar common electrode.

The first common electrode is the planar common electrode and the second common electrode is the patternized common electrode; in the manufacturing process of the high transmittance PSVA liquid crystal display panel, the voltage is applied to the pixel electrode and the second common electrode; in the use of the high transmittance PSVA liquid crystal display panel, the voltage is applied to the pixel electrode and the first common electrode.

The second common electrode is the planar common electrode and the first common electrode is the patternized common electrode; in the manufacturing process of the high transmittance PSVA liquid crystal display panel, the voltage is applied to the pixel electrode and the first common electrode; in the use of the high transmittance PSVA liquid crystal display panel, the voltage is applied to the pixel electrode and the second common electrode.

The patternized common electrode comprises a star-shaped pattern.

The first common electrode, the second common electrode, and the pixel electrode comprise a material of indium tin oxide (ITO); and the insulation layer comprises a material of silicon nitride or silicon oxide.

The polymer projections are formed through polymerization of the polymerizable monomers caused by irradiation of ultraviolet (UV) light.

The polymerizable monomers comprise one of acrylate ester and derivatives thereof, methacrylate ester and derivatives thereof, styrene and derivatives thereof, epoxy rein and fatty amine epoxy curing agent, or a combination thereof.

The present invention also provides a manufacturing method of a high transmittance PSVA liquid crystal display panel, which comprises the following steps:

(1) providing an upper substrate and a lower substrate, wherein a first common electrode, an insulation layer covering the first common electrode, and a second common electrode located on the insulation layer are first formed in sequence on the upper substrate, one of the first common electrode and the second common electrode being a patternized common electrode, which corresponds to each of sub-pixels, the patternized common electrode being divided into a plurality of zones and each zone comprising a pattern comprising common electrode branches extending in various directions and alternating with spacing slits; and the other one being a planar common electrode that has a uniform thickness and is continuous without interruption;

a pixel electrode is formed on the lower substrate and the pixel electrode is a planar electrode that has a uniform thickness and is continuous without interruption; and the upper and lower substrates are then laminated together and a mixture of liquid crystal molecules and polymerizable monomers is filled between the second common electrode and the pixel electrode;

(2) applying a voltage to the pixel electrode and the patternized common electrode to cause the liquid crystal molecules to tilt in various directions along spacing slits so as to form multiple domains in each of the sub-pixels; and (3) in the same time of applying a voltage to the pixel electrode and the patternized common electrode, applying UV light irradiation to cause polymerization of the polymerizable monomers to form polymer projections attached to surfaces of the pixel electrode and the second common electrode for aligning the liquid crystal molecules contained in a liquid crystal layer thereby setting the liquid crystal molecules at predetermined pre-tilt angles.

The patternized common electrode comprises a star-shaped pattern; the first common electrode, the second common electrode, and the pixel electrode comprises a material of ITO; the insulation layer comprises a material of silicon nitride or silicon oxide.

The polymerizable monomers comprise one of acrylate ester and derivatives thereof, methacrylate ester and derivatives thereof, styrene and derivatives thereof, epoxy rein and fatty amine epoxy curing agent, or a combination thereof.

The present invention further provides a high transmittance PSVA liquid crystal display panel, which comprises an upper substrate and a lower substrate that is opposite to the upper substrate, a first common electrode, an insulation layer, and a second common electrode that are arranged to stack, in sequence from top to bottom, on a surface of the upper substrate that faces the lower substrate, a pixel electrode that is arranged on a surface of the lower substrate that faces the upper substrate, a liquid crystal layer interposed between the second common electrode and the pixel electrode, and a plurality of polymer projections formed on surfaces of the second common electrode and the pixel electrode;

one of the first common electrode and the second common electrode being a patternized common electrode, which corresponds to each of sub-pixels, the patternized common electrode being divided into a plurality of zones and each zone comprising a pattern comprising common electrode branches extending in various directions and alternating with spacing slits; and the other one being a planar common electrode that has a uniform thickness and is continuous without interruption;

the pixel electrode being a planar electrode that has a uniform thickness and is continuous without interruption;

the polymer projections align liquid crystal molecules contained in the liquid crystal layer so as to set the liquid crystal molecules at predetermined pre-tilt angles;

wherein in a manufacturing process of the high transmittance PSVA liquid crystal display panel, a voltage is applied to the pixel electrode and the patternized common electrode; and in a use of the high transmittance PSVA liquid crystal display panel, a voltage is applied to the pixel electrode and the planar common electrode;

wherein the first common electrode is the planar common electrode and the second common electrode is the patternized common electrode; in the manufacturing process of the high transmittance PSVA liquid crystal display panel, the voltage is applied to the pixel electrode and the second common electrode; in the use of the high transmittance PSVA liquid crystal display panel, the voltage is applied to the pixel electrode and the first common electrode;

wherein the patternized common electrode comprises a star-shaped pattern; and wherein the polymer projections are formed through polymerization of the polymerizable monomers caused by irradiation of UV light.

The efficacy of the present invention is that the present invention provides a high transmittance PSVA liquid crystal display panel, which comprises an upper substrate on which a first common electrode, an insulation layer, and a second common electrode are formed, a lower substrate on which a pixel electrode is formed, and a plurality of polymer projections formed on surfaces of the second common electrode and the pixel electrode to align liquid crystal molecules, wherein one of the first common electrode and the second common electrode is a patternized common electrode corresponding to each of sub-pixels, the patternized common electrode being divided into a plurality of zones, each zone comprising a pattern comprising common electrode branches extending in various directions and alternating with spacing slits; while the other one is a planar common electrode that has a uniform thickness and is continuous without interruption and wherein the pixel electrode is a planar electrode that has a uniform thickness and is continuous without interruption. In a manufacturing process of the high transmittance PSVA liquid crystal display panel, a voltage is applied to the pixel electrode and the patternized common electrode to cause the liquid crystal molecules to tilt in various directions along spacing slits so as to form multiple domains in each sub-pixel; and in a user of the high transmittance PSVA liquid crystal display panel, through application of a voltage to the pixel electrode and the planar common electrode, the entire pixel area may simultaneously achieve the maximum transmittance, thereby overcoming the issue of transmittance reduction of the prior art due to patternization of the pixel electrode and helping improve homogeneity of transmittance and brightness of the PSVA liquid crystal display panel, reducing the requirement of backlighting brightness by the PSVA liquid crystal display panel, and lowering down cost and power consumption of use. The present invention provides a manufacturing method of a high transmittance PSVA liquid crystal display panel, in which a first common electrode, an insulation layer, and a second common electrode are formed on an upper substrate and a pixel electrode is formed on the lower substrate, wherein one of the first common electrode and the second common electrode is a patternized common electrode and the other is a planar common electrode, the pixel electrode being a planar electrode, whereby through irradiation of UV light to cause polymerization of polymerizable monomers to form polymer projections that align the liquid crystal molecules so as to make the transmittance of the PSVA liquid crystal display panel high, the brightness homogeneous, the requirement of backlighting brightness by the PSVA liquid crystal display panel being reduced, and cost and power consumption of use being lowered.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of an embodiment of the present invention, with reference to the attached drawing.

In the drawing:

FIG. 14 is a flow chart illustrating a manufacturing method of a PSVA liquid crystal display panel according to the present invention;

DETAILED DESCRIPTION OF THE PREFERRED EMBODIMENTS

Figure 1:
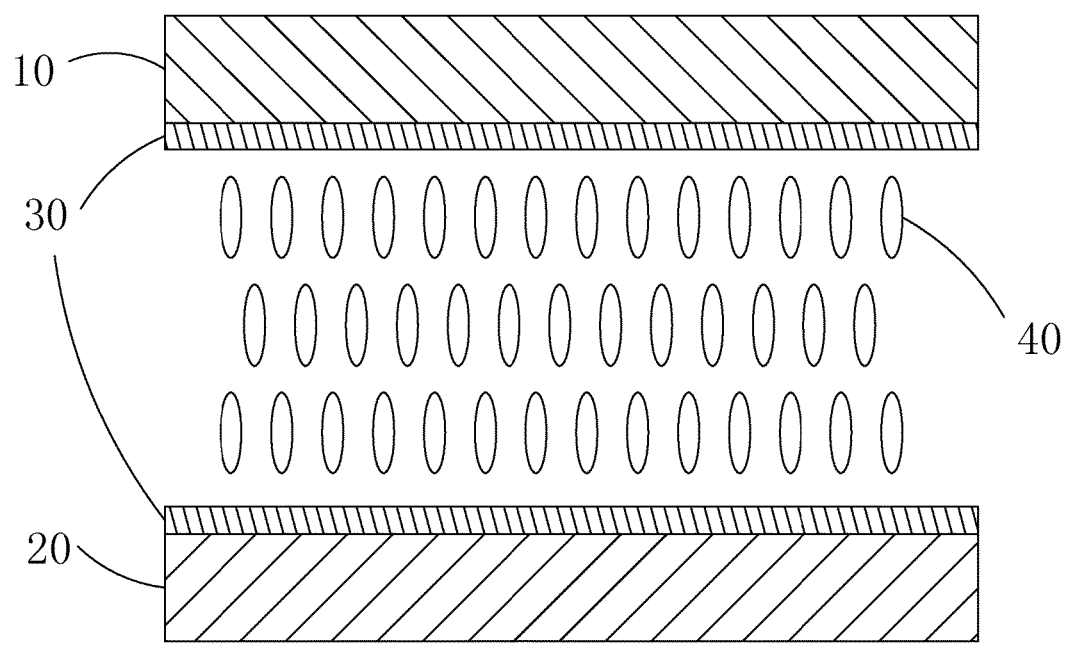
FIG. 1 is a cross-sectional view showing a conventional vertical alignment (VA) type liquid crystal display panel.
Figure 2:
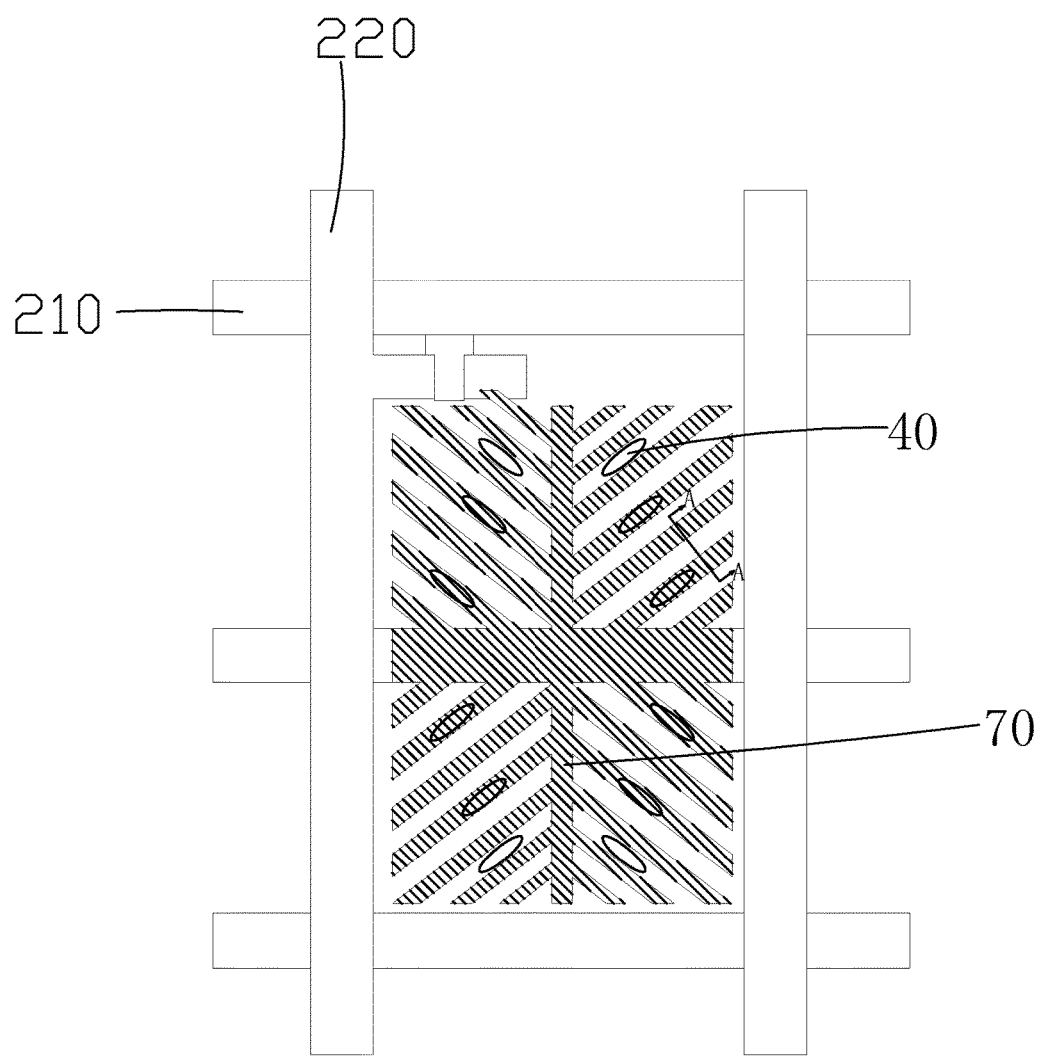
FIG. 2 is a top plan view of one side of a lower substrate of a conventional multi-domain vertical alignment (MVA) type liquid crystal display panel.
Figure 3:
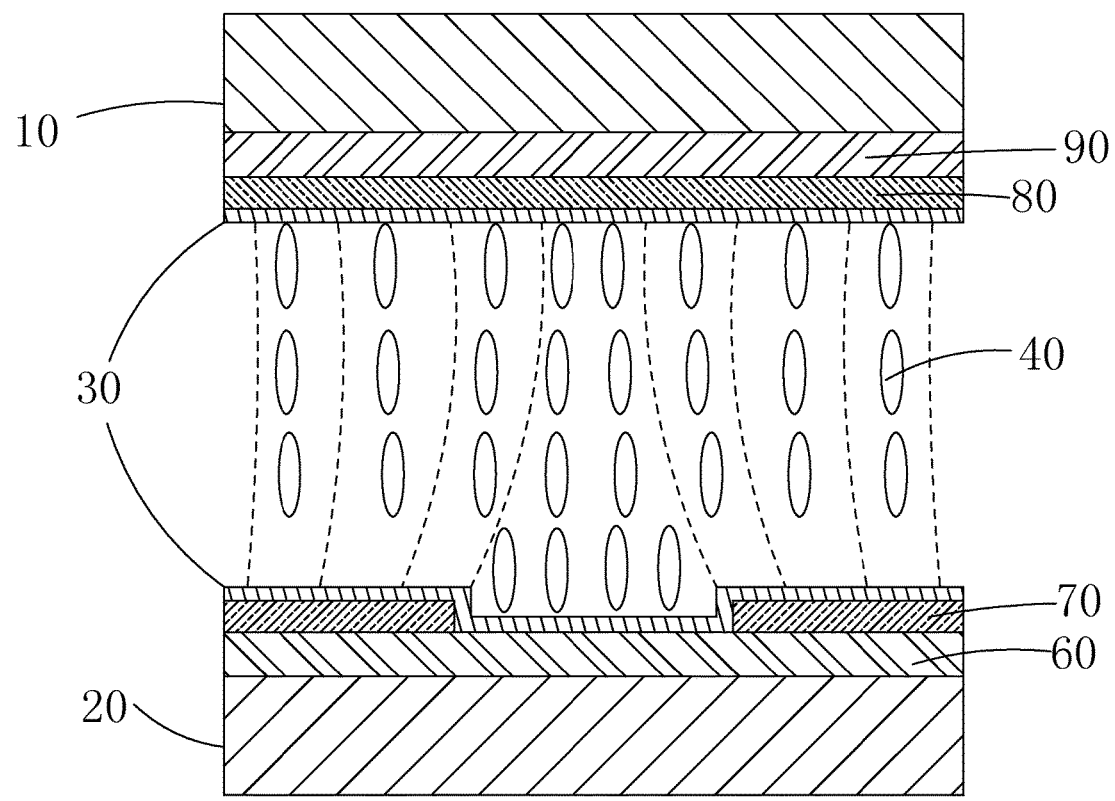
FIG. 3 is a cross-sectional view of the conventional MVA type liquid crystal display panel taken along line A-A of FIG. 2.
Figure 4:
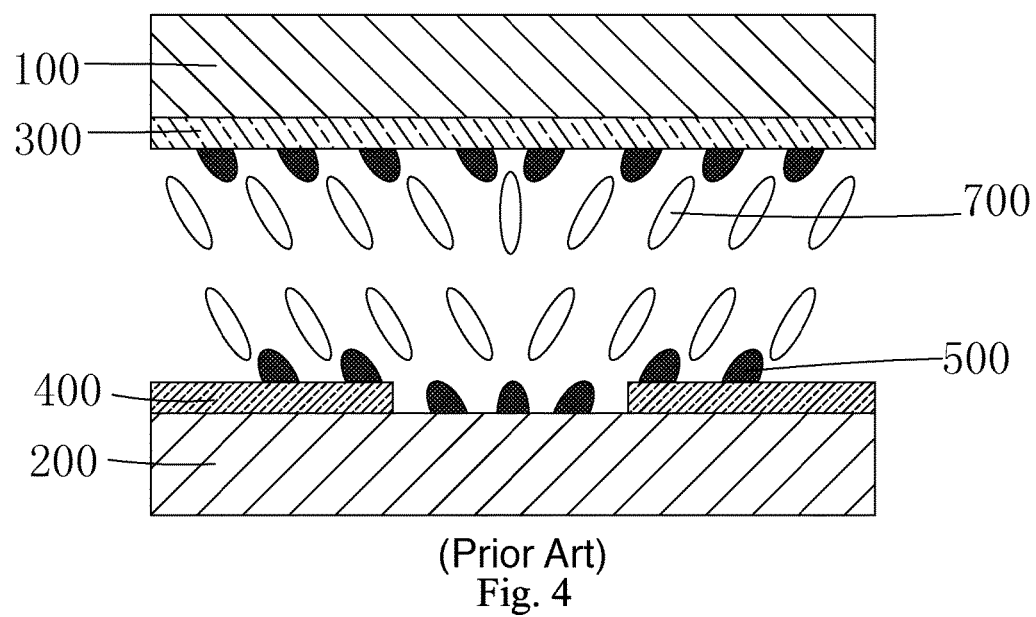
FIG. 4 is a cross-sectional view of a conventional polymer stabilized vertical alignment (PSVA) liquid crystal display panel.
Figure 5:
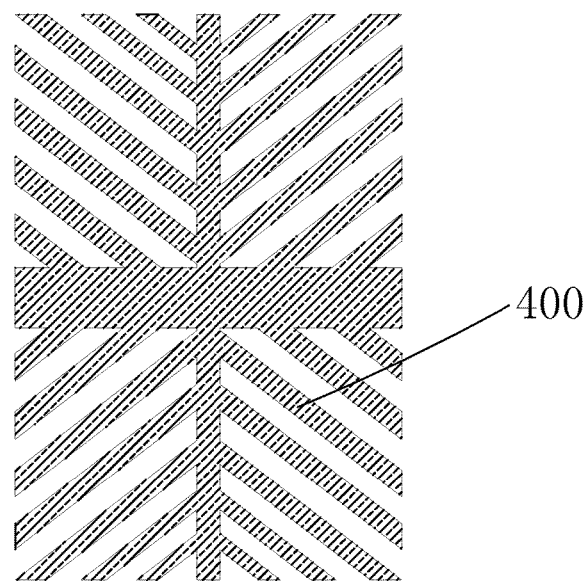
FIG. 5 is a top plan view of a pixel electrode of the conventional PSVA liquid crystal display panel shown in FIG. 4.
Figure 6:
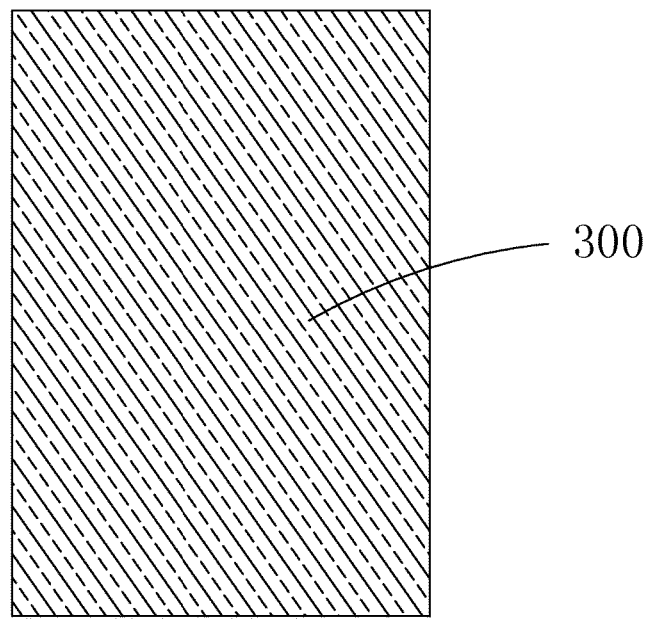
FIG. 6 is a bottom view of a common electrode of the conventional PSVA liquid crystal display panel shown in FIG. 4.
Figure 7:
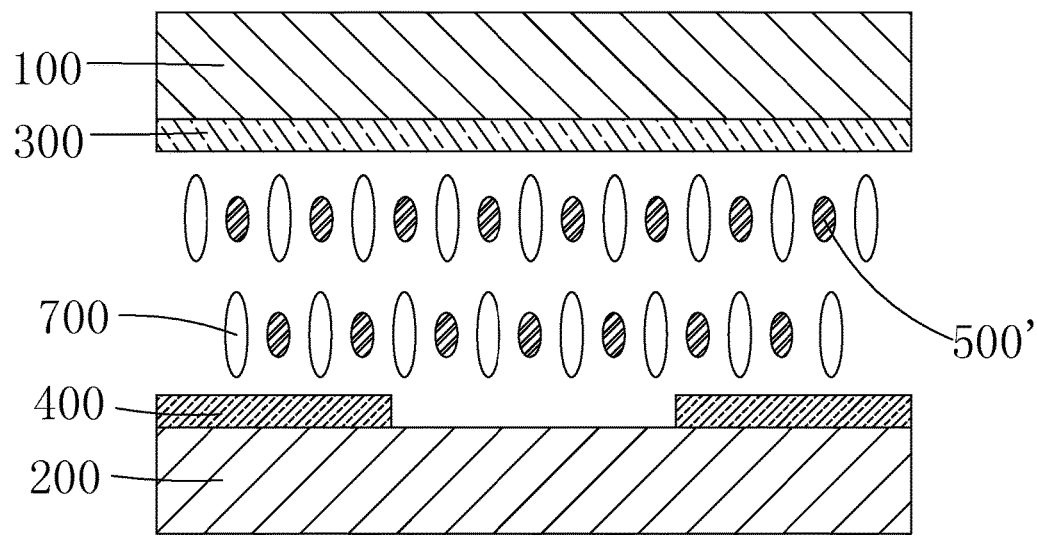
FIGS. 7-9 are schematic views illustrating key manufacturing processes of the conventional PSVA liquid crystal display panel.
Figure 8:
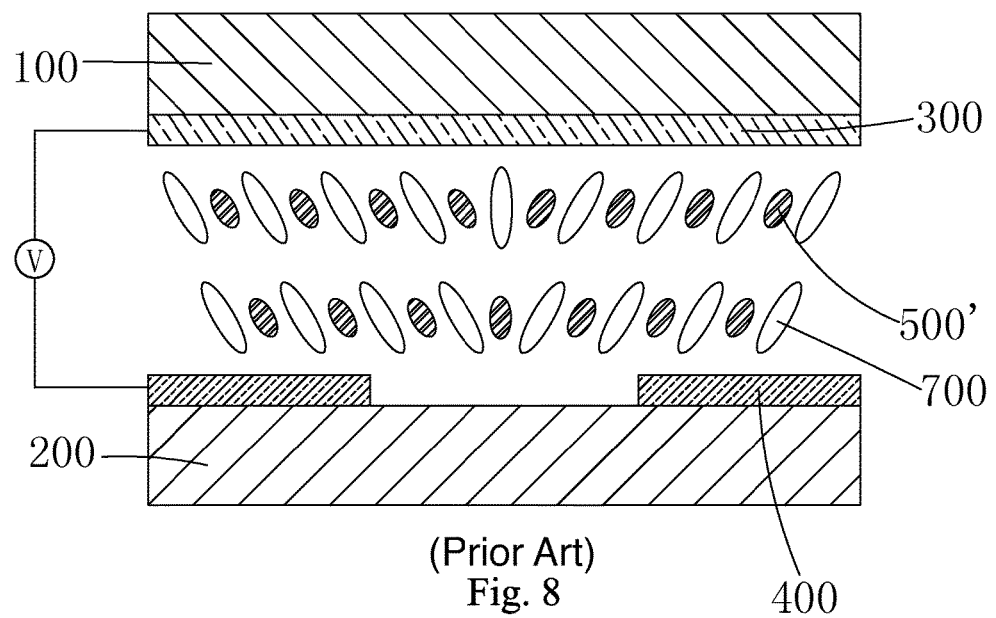
Figure 9:
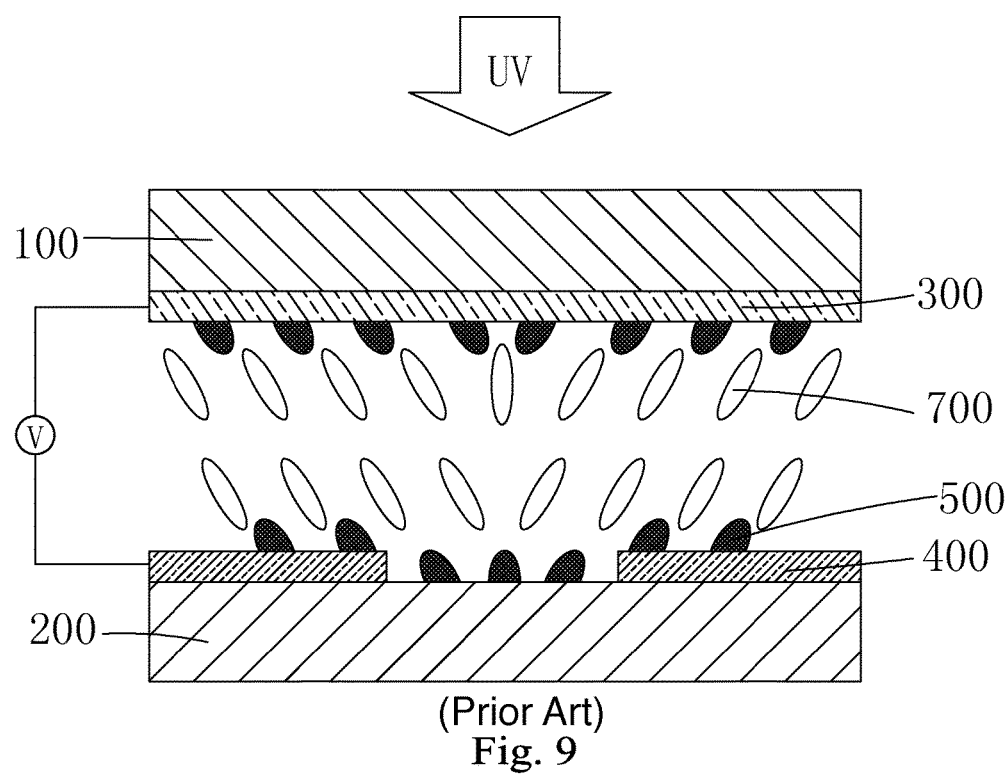

To further expound the technical solution adopted in the present invention and the advantages thereof, a detailed description is given to a preferred embodiment of the present invention and the attached drawings.

Referring collectively to FIGS. 10-13, firstly, the present invention provides a high transmittance polymer stabilized vertical alignment (PSVA) liquid crystal display panel, which comprises an upper substrate 1 and a lower substrate 2 that is opposite to the upper substrate 1, a first common electrode 31, an insulation layer 32, and a second common electrode 33 that are arranged to stack, in sequence from top to bottom, on a surface of the upper substrate 1 that faces the lower substrate 2, a pixel electrode 4 that is arranged on a surface of the lower substrate 2 that faces the upper substrate 1, a liquid crystal layer interposed between the second common electrode 33 and the pixel electrode 4, and a plurality of polymer projections 5 formed on surfaces of the second common electrode 33 and the pixel electrode 4.

One of the first common electrode 31 and the second common electrode 33 is a patternized common electrode, which corresponds to each of sub-pixels, the patternized common electrode being divided into a plurality of zones and each zone comprising a pattern comprising common electrode branches extending in various directions and alternating with spacing slits; and the other one is a planar common electrode that has a uniform thickness and is continuous without interruption.

The pixel electrode 4 is a planar electrode that has a uniform thickness and is continuous without interruption.

The polymer projections 5 function to align liquid crystal molecules 7 contained in the liquid crystal layer so as to set the liquid crystal molecules 7 at predetermined pre-tilt angles.

Figure 10:
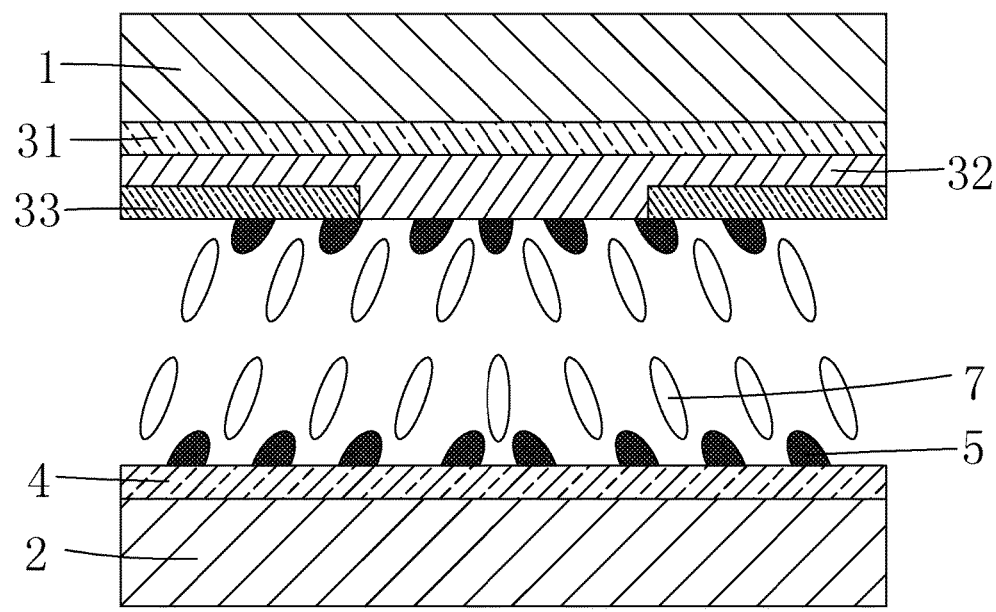
FIG. 10 is a cross-sectional view showing a PSVA liquid crystal display panel according to the present invention.
Figure 11:
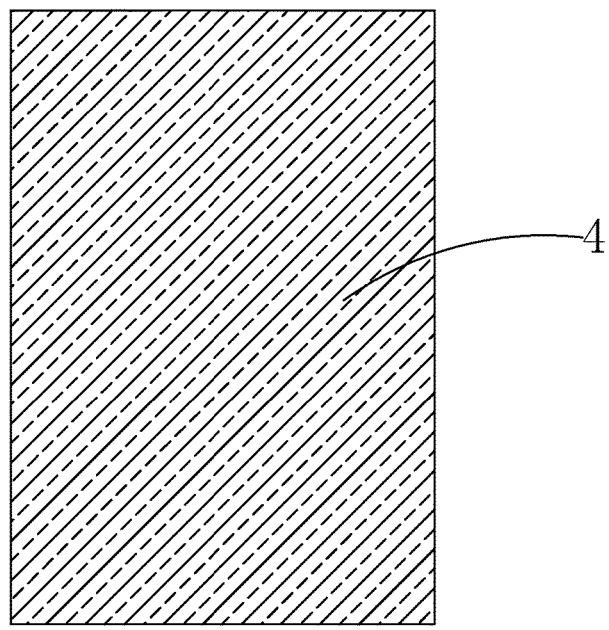
FIG. 11 is a top plan view of a pixel electrode of the PSVA liquid crystal display panel according to the present invention.
Figure 12:
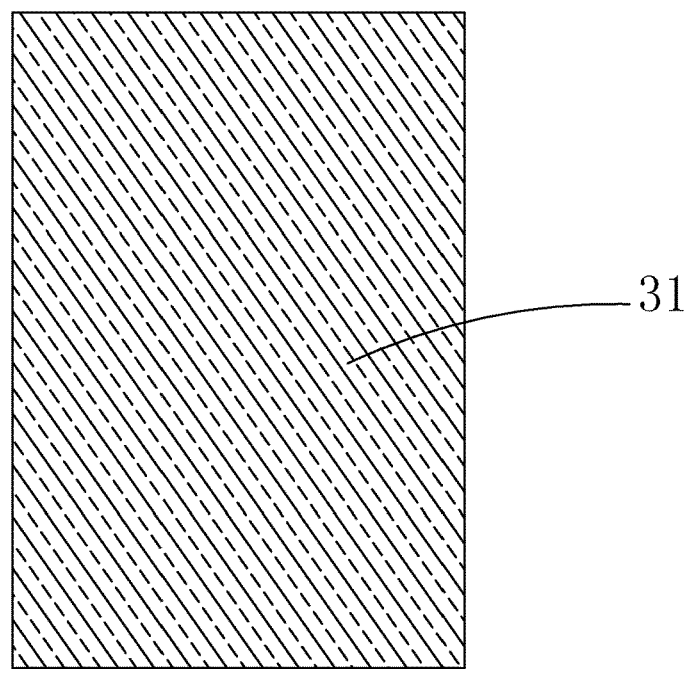
FIG. 12 is a bottom view of a first common electrode of the PSVA liquid crystal display panel according to the present invention.
Figure 13:
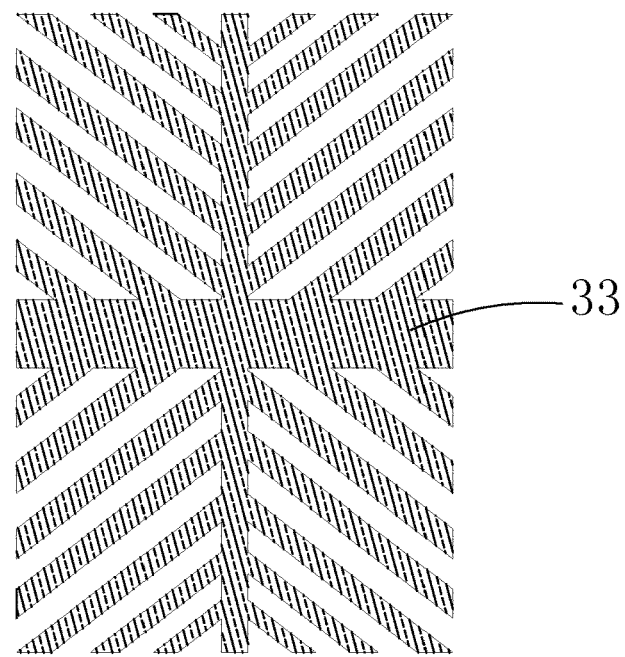
FIG. 13 is a bottom view of a second common electrode of the PSVA liquid crystal display panel according to the present invention.

FIGS. 10, 12, and 13 schematically illustrate an example where the first common electrode 31 is the planar common electrode and the second common electrode 33 is the patternized common electrode. Certainly, the locations of the patternized common electrode and the planar common electrode can be switched with each other, meaning the second common electrode 33 serves as the planar common electrode while the first common electrode 31 is the patternized common electrode.

The patternized common electrode provides an effect in a manufacturing process of the high transmittance PSVA liquid crystal display panel, while the planar common electrode provides an effect in a use of the high transmittance PSVA liquid crystal display panel.

Figure 18:
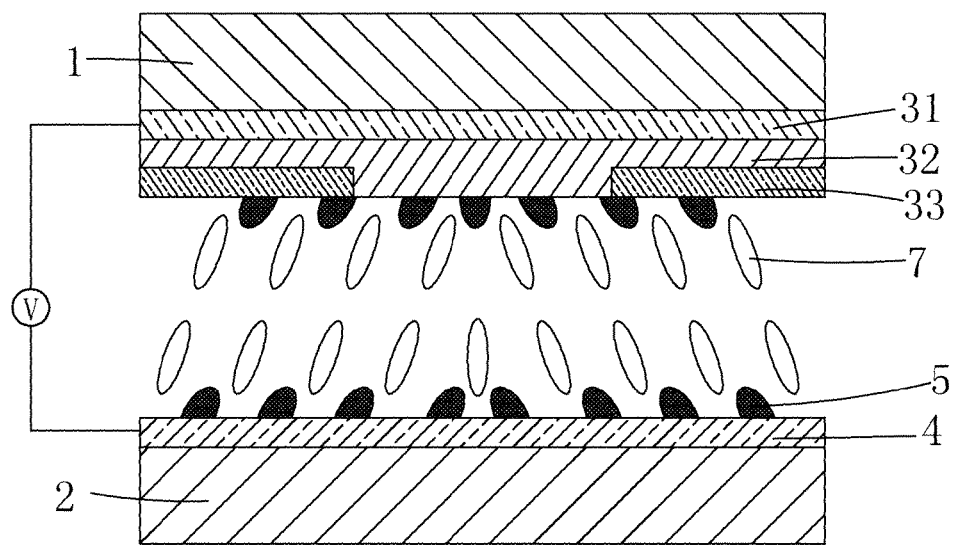
FIG. 18 is a schematic view illustrating a state of use of the PSVA liquid crystal display panel according to the present invention.

Considering the example that the first common electrode 31 is the planar common electrode and the second common electrode 33 is the patternized common electrode, in the manufacturing process of the high transmittance PSVA liquid crystal display panel, application of a voltage to the pixel electrode 4 and the second common electrode 33 allows an inclined electric field to be established between the pixel electrode 4 and the second common electrode 33 so that the liquid crystal molecules 7 tilt in various directions of the spacing slits so as to form multiple zones in each sub-pixel, this, in combination with subsequent irradiation of ultraviolet (UV) light to cause polymerization of polymerizable monomers to form the polymer projections 5, providing the liquid crystal molecules 7 with predetermined pre-tilt angle. In the use of the high transmittance PSVA liquid crystal display panel, as shown in FIG. 18, with application of a voltage to the pixel electrode 4 and the first common electrode 31, since the pixel electrode 4 and the first common electrode 31 are both planar electrodes, an electrical field established between the two is uniform, so the entire pixel area may simultaneously achieve the maximum transmittance, thereby overcoming the issue of transmittance reduction of the prior art due to patternization of the pixel electrode and helping improve homogeneity of transmittance and brightness of the PSVA liquid crystal display panel, reducing the requirement of backlighting brightness by the PSVA liquid crystal display panel, and lowering down cost and power consumption of use.

Of course, if the second common electrode 33 is used as the planar common electrode, while the first common electrode 31 is the patternized common electrode, then in the manufacturing process of the high transmittance PSVA liquid crystal display panel, voltage application is done on the pixel electrode 4 and the first common electrode 31; and in the use of the high transmittance PSVA liquid crystal display panel, voltage application is done on the pixel electrode 4 and the second common electrode 33.

Specifically, the upper substrate 1 is generally a color filter (CF) substrate that is conventionally used, and the lower substrate 2 is generally a thin-film transistor (TFT) substrate that is commonly used.

As shown in FIG. 13, the patternized common electrode comprises a star-shaped pattern, visually comprising an addition symbol like part and a multiplication symbol like part superimposed each other.

The first common electrode 31, the second common electrode 33, and the pixel electrode 4 each comprise a material of indium tin oxide (ITO).

The insulation layer 32 comprises a material of silicon nitride or silicon oxide.

The polymerizable monomers comprise one of acrylate ester and derivatives thereof, methacrylate ester and derivatives thereof, styrene and derivatives thereof, epoxy rein, and fatty amine epoxy curing agent, or a combination thereof.

Figure 15:
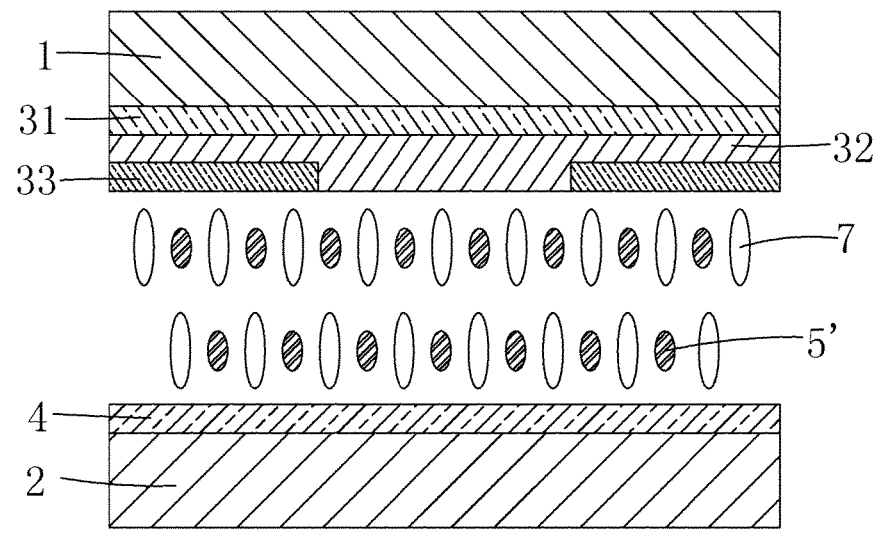
FIG. 15 is a schematic view illustrating a first step of the manufacturing method of the PSVA liquid crystal display panel according to the present invention.

Referring to FIG. 14, the present invention also provides a manufacturing method of a high transmittance PSVA liquid crystal display panel, which comprises the following steps:

Step 1: as shown in FIG. 15, providing an upper substrate 1 and a lower substrate 2.

A first common electrode 31, an insulation layer 32 covering the first common electrode 31, and a second common electrode 33 located on the insulation layer 32 are first formed in sequence on the upper substrate 1. One of the first common electrode 31 and the second common electrode 33 is a patternized common electrode, which corresponds to each of sub-pixels, the patternized common electrode being divided into a plurality of zones and each zone comprising a pattern comprising common electrode branches extending in various directions and alternating with spacing slits; and the other one is a planar common electrode that has a uniform thickness and is continuous without interruption. A pixel electrode 4 is formed on the lower substrate 2 and the pixel electrode 4 is a planar electrode that has a uniform thickness and is continuous without interruption.

FIGS. 12 and 13 schematically illustrate an example where the first common electrode 31 is the planar common electrode and the second common electrode 33 is the patternized common electrode. Certainly, the locations of the patternized common electrode and the planar common electrode can be switched with each other, meaning the second common electrode 33 serves as the planar common electrode while the first common electrode 31 is the patternized common electrode.

The upper and lower substrates 1, 2 are then laminated together and a mixture of liquid crystal molecules 7 and polymerizable monomers 5' is filled between the second common electrode 33 and the pixel electrode 4.

Step 2: applying a voltage to the pixel electrode 4 and the patternized common electrode to cause the liquid crystal molecules 7 to tilt in various directions along spacing slits so as to form multiple domains in each of sub-pixels.

Figure 16:
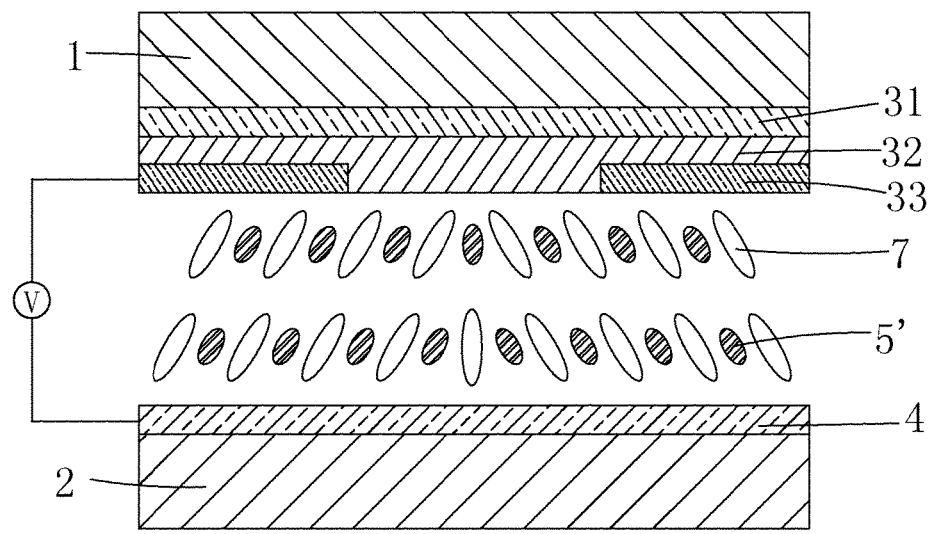
FIG. 16 is a schematic view illustrating a second step of the manufacturing method of the PSVA liquid crystal display panel according to the present invention.

FIG. 16 illustrates, with an example where the second common electrode 33 is the patternized common electrode and the first common electrode 31 is the planar common electrode, an inclined electric field is formed through application of a voltage to the pixel electrode 4 and the second common electrode 33 in Step 2 so as to have the liquid crystal molecules 7 tilt in various directions along the spacing slits.

Figure 17:
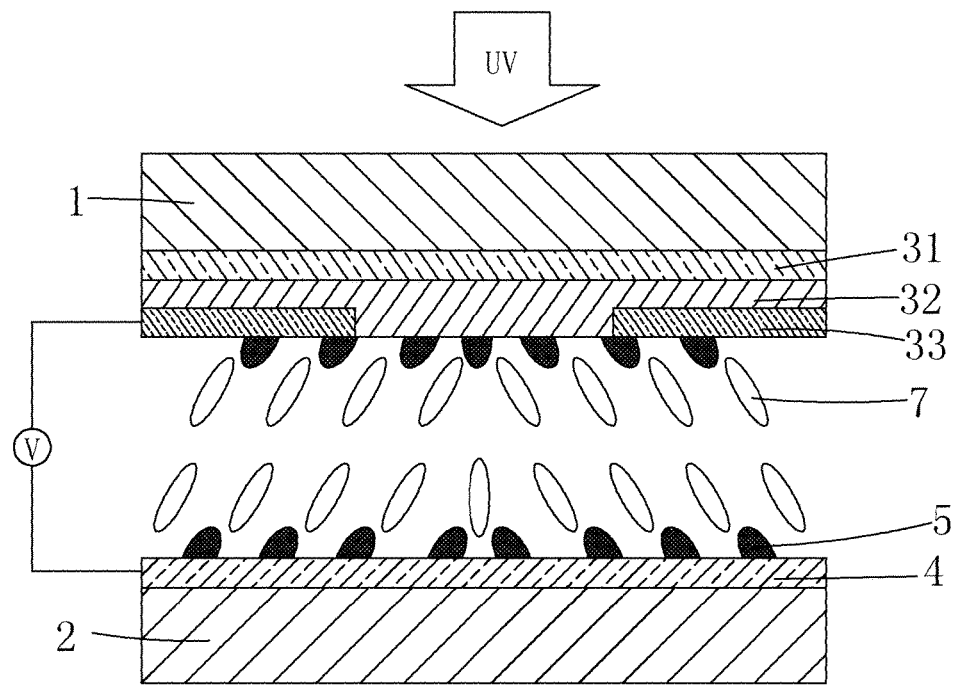
FIG. 17 is a schematic view illustrating a third step of the manufacturing method of the PSVA liquid crystal display panel according to the present invention.

Step 3: as shown in FIG. 17, with the example where the second common electrode 33 is the patternized common electrode and the first common electrode 31 is the planar common electrode, in the same time of applying a voltage to the pixel electrode 4 and the patternized common electrode, which is the second common electrode 33, applying ultraviolet (UV) light irradiation to cause polymerization of the polymerizable monomers 5' to form polymer projections 5 attached to surfaces of the pixel electrode 4 and the second common electrode 33 for aligning the liquid crystal molecules 7 contained in the liquid crystal layer thereby setting the liquid crystal molecules 7 at predetermined pre-tilt angles.

To this point, the manufacturing of the high transmittance PSVA liquid crystal display panel is completed.

Specifically, the patternized common electrode comprises a star like pattern and the first common electrode 31, the second common electrode 33, and the pixel electrode 4 comprises a material of ITO; the insulation layer 32 comprises a material of silicon nitride or silicon oxide.

As shown in FIG. 18, with the example where the second common electrode 33 is the patternized common electrode and the first common electrode 31 is the planar common electrode, when a liquid crystal display panel manufactured with the above method is used, with a voltage being applied to the pixel electrode 4 and the first common electrode 31, since the pixel electrode 4 and the first common electrode 31 are both planar electrodes, an electrical field established between the two is uniform, so the entire pixel area may simultaneously achieve the maximum transmittance, thereby overcoming the issue of transmittance reduction of the prior art due to patternization of the pixel electrode and helping improve homogeneity of transmittance and brightness of the PSVA liquid crystal display panel, reducing the requirement of backlighting brightness by the PSVA liquid crystal display panel, and lowering down cost and power consumption of use.

In summary, the present invention provides a high transmittance PSVA liquid crystal display panel, which comprises an upper substrate on which a first common electrode, an insulation layer, and a second common electrode are formed, a lower substrate on which a pixel electrode is formed, and a plurality of polymer projections formed on surfaces of the second common electrode and the pixel electrode to align liquid crystal molecules, wherein one of the first common electrode and the second common electrode is a patternized common electrode corresponding to each of sub-pixels, the patternized common electrode being divided into a plurality of zones, each zone comprising a pattern comprising common electrode branches extending in various directions and alternating with spacing slits; while the other one is a planar common electrode that has a uniform thickness and is continuous without interruption and wherein the pixel electrode is a planar electrode that has a uniform thickness and is continuous without interruption. In a manufacturing process of the high transmittance PSVA liquid crystal display panel, a voltage is applied to the pixel electrode and the patternized common electrode to cause the liquid crystal molecules to tilt in various directions along spacing slits so as to form multiple domains in each sub-pixel; and in a user of the high transmittance PSVA liquid crystal display panel, through application of a voltage to the pixel electrode and the planar common electrode, the entire pixel area may simultaneously achieve the maximum transmittance, thereby overcoming the issue of transmittance reduction of the prior art due to patternization of the pixel electrode and helping improve homogeneity of transmittance and brightness of the PSVA liquid crystal display panel, reducing the requirement of backlighting brightness by the PSVA liquid crystal display panel, and lowering down cost and power consumption of use. The present invention provides a manufacturing method of a high transmittance PSVA liquid crystal display panel, in which a first common electrode, an insulation layer, and a second common electrode are formed on an upper substrate and a pixel electrode is formed on the lower substrate, wherein one of the first common electrode and the second common electrode is a patternized common electrode and the other is a planar common electrode, the pixel electrode being a planar electrode, whereby through irradiation of UV light to cause polymerization of polymerizable monomers to form polymer projections that align the liquid crystal molecules so as to make the transmittance of the PSVA liquid crystal display panel high, the brightness homogeneous, the requirement of backlighting brightness by the PSVA liquid crystal display panel being reduced, and cost and power consumption of use being lowered.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A high transmittance polymer stabilized vertical alignment (PSVA) liquid crystal display panel, comprising an upper substrate and a lower substrate that is opposite to the upper substrate, a first common electrode, an insulation layer, and a second common electrode that are arranged to stack, in sequence from top to bottom, on a surface of the upper substrate that faces the lower substrate, a pixel electrode that is arranged on a surface of the lower substrate that faces the upper substrate, a liquid crystal layer interposed between the second common electrode and the pixel electrode, and a plurality of polymer projections formed on surfaces of the second common electrode and the pixel electrode;

one of the first common electrode and the second common electrode being a patternized common electrode, which corresponds to each of sub-pixels, the patternized common electrode being divided into a plurality of zones and each zone comprising a pattern comprising common electrode branches extending in various directions and alternating with spacing slits; and the other one being a planar common electrode that has a uniform thickness and is continuous without interruption;

the pixel electrode being a planar electrode that has a uniform thickness and is continuous without interruption;

the polymer projections align liquid crystal molecules contained in the liquid crystal layer so as to set the liquid crystal molecules at predetermined pre-tilt angles;

wherein in a manufacturing process of the high transmittance PSVA liquid crystal display panel, a voltage is applied to the pixel electrode and the patternized common electrode; and in a use of the high transmittance PSVA liquid crystal display panel, a voltage is applied to the pixel electrode and the planar common electrode, wherein no voltage is applied to the patternized common electrode and the planar common electrode simultaneously; and wherein the planar common electrode and the patternized common electrode are alternatively supplied with respective electrical voltages such that the planar common electrode, when supplied with the respective electrical voltage, generates an electric field between the planar common electrode and the pixel electrode without interference caused by the voltage supplied to the patternized common electrode, the electric field being uniform as being established between the planar common electrode and the pixel electrode that is also a planar electrode.

2. The high transmittance PSVA liquid crystal display panel as claimed in claim 1, wherein the first common electrode is the planar common electrode and the second common electrode is the patternized common electrode; in the manufacturing process of the high transmittance PSVA liquid crystal display panel, the voltage is applied to the pixel electrode and the second common electrode; in the use of the high transmittance PSVA liquid crystal display panel, the voltage is applied to the pixel electrode and the first common electrode.

3. The high transmittance PSVA liquid crystal display panel as claimed in claim 1, wherein the second common electrode is the planar common electrode and the first common electrode is the patternized common electrode; in the manufacturing process of the high transmittance PSVA liquid crystal display panel, the voltage is applied to the pixel electrode and the first common electrode; in the use of the high transmittance PSVA liquid crystal display panel, the voltage is applied to the pixel electrode and the second common electrode.

4. The high transmittance PSVA liquid crystal display panel as claimed in claim 1, wherein the patternized common electrode comprises a star-shaped pattern.

5. The high transmittance PSVA liquid crystal display panel as claimed in claim 1, wherein the first common electrode, the second common electrode, and the pixel electrode comprise a material of indium tin oxide (ITO); and
the insulation layer comprises a material of silicon nitride or silicon oxide.

6. The high transmittance PSVA liquid crystal display panel as claimed in claim 1, wherein the polymer projections are formed through polymerization of the polymerizable monomers caused by irradiation of ultraviolet (UV) light.

7. The high transmittance PSVA liquid crystal display panel as claimed in claim 6, wherein the polymerizable monomers comprise one of acrylate ester and derivatives thereof, methacrylate ester and derivatives thereof, styrene and derivatives thereof, epoxy rein and fatty amine epoxy curing agent, or a combination thereof.

8. A high transmittance polymer stabilized vertical alignment (PSVA) liquid crystal display panel, comprising an upper substrate and a lower substrate that is opposite to the upper substrate, a first common electrode, an insulation layer, and a second common electrode that are arranged to stack, in sequence from top to bottom, on a surface of the upper substrate that faces the lower substrate, a pixel electrode that is arranged on a surface of the lower substrate that faces the upper substrate, a liquid crystal layer interposed between the second common electrode and the pixel electrode, and a plurality of polymer projections formed on surfaces of the second common electrode and the pixel electrode;

one of the first common electrode and the second common electrode being a patternized common electrode, which corresponds to each of sub-pixels, the patternized common electrode being divided into a plurality of zones and each zone comprising a pattern comprising common electrode branches extending in various directions and alternating with spacing slits; and the other one being a planar common electrode that has a uniform thickness and is continuous without interruption;

the pixel electrode being a planar electrode that has a uniform thickness and is continuous without interruption;

the polymer projections align liquid crystal molecules contained in the liquid crystal layer so as to set the liquid crystal molecules at predetermined pre-tilt angles;

wherein in a manufacturing process of the high transmittance PSVA liquid crystal display panel, a voltage is applied to the pixel electrode and the patternized common electrode; and in a use of the high transmittance PSVA liquid crystal display panel, a voltage is applied to the pixel electrode and the planar common electrode, wherein no voltage is applied to the patternized common electrode and the planar common electrode simultaneously;

wherein the planar common electrode and the patternized common electrode are alternatively supplied with respective electrical voltages such that the planar common electrode, when supplied with the respective electrical voltage, generates an electric field between the planar common electrode and the pixel electrode without interference caused by the voltage supplied to the patternized common electrode, the electric field being uniform as being established between the planar common electrode and the pixel electrode that is also a planar electrode;

wherein the first common electrode is the planar common electrode and the second common electrode is the patternized common electrode; in the manufacturing process of the high transmittance PSVA liquid crystal display panel, the voltage is applied to the pixel electrode and the second common electrode; in the use of the high transmittance PSVA liquid crystal display panel, the voltage is applied to the pixel electrode and the first common electrode;

wherein the patternized common electrode comprises a star-shaped pattern; and wherein the polymer projections are formed through polymerization of the polymerizable monomers caused by irradiation of ultraviolet (UV) light.

9. The high transmittance PSVA liquid crystal display panel as claimed in claim 8, wherein the first common electrode, the second common electrode, and the pixel electrode comprise a material of indium tin oxide; and the insulation layer comprises a material of silicon nitride or silicon oxide.

10. The high transmittance PSVA liquid crystal display panel as claimed in claim 8, wherein the polymerizable monomers comprise one of acrylate ester and derivatives thereof, methacrylate ester and derivatives thereof, styrene and derivatives thereof, epoxy rein and fatty amine epoxy curing agent, or a combination thereof.

* * * * *